May 10, 1966   R. LANG ET AL   3,250,199
PHOTOGRAPHIC SHUTTER
Filed Nov. 4, 1963   4 Sheets-Sheet 1

United States Patent Office 3,250,199
Patented May 10, 1966

3,250,199
PHOTOGRAPHIC SHUTTER
Rudolf Lang, Grafing, near Munich, and Peter Lermann, Munich, Germany, assignors to Compur-Werk Gesellschaft mit beschrankter Haftung & Co., Munich, Germany, a German firm
Filed Nov. 4, 1963, Ser. No. 321,174
Claims priority, application Germany, Nov. 30, 1962, C 28,538
9 Claims. (Cl. 95—63)

This invention relates to a photographic shutter, and more particularly to a shutter having two separate series or sets of shutter blades independently movable for controlling the exposure, the first set of blades opening to initiate the exposure while the second set is already open, and the second set of blades then closing to terminate the exposure while the first set is still open. With such an arrangement, it is not necessary for the blades to reverse their directions of movement during the making of an exposure, and it is possible to obtain extremely fast exposures of short duration, without the necessity of resorting to double-ended blades or other special shapes of blades.

An object of the invention is the provision of a generally improved and more satisfactory shutter of this kind.

Another object is the provision of a shutter of this kind, having improved means for controlling the action of the two sets of blades with respect to each other.

Still another object is the provision of a construction having simple and compact differential gear means for controlling the timed relationship of the two sets of blades with respect to each other.

A further object is the provision of a shutter of this kind, in which the lapse of time between the release or unlatching of the first set of blades for opening the exposure aperture and the release or unlatching of the second set of blades for closing the exposure aperture, is adjustable very easily and conveniently, in a smooth or continuous manner.

A still further object is the provision of an improved shutter of this kind, having two separate series or sets of shutter blades, so designed that all of the cocking or tensioning functions of the shutter as well as the running-down and exposure-making functions are initiated and controlled by movements of a central control member, preferably in the form of a ring rotatable about the optical axis as a center.

A still further object is the provision of an improved objective shutter wherein the duration or speed of an internally timed exposure may be adjusted throughout a very great range, much greater than the range customarily available in most of the previously available objective shutters, e.g. throughout a range from 1 second to 1/2000 of a second, and wherein both flash synchronizer operation and pre-timer or delayed action operation are available, selectively when desired, at all shutter speeds within the range.

These and other desirable objects may be attained in the manner disclosed as an illustrative embodiment of the invention in the following description and in the accompanying drawings forming a part hereof, in which.

Referring now to the drawings, the shutter comprises a housing or casing indicated in general at 10, preferably of the usual annular shape customary with objective shutters. As usual, there is a central aperture through the shutter, through which light passes when the shutter blades are open. The shutter mechanism is mounted in the annular space surrounding the central aperture.

In the shutter of the present invention, there are two separate sets or series of shutter blades, movable independently of each other in the sense that each set can be moved without moving the other set, although in normal operation of the shutter one set of blades is moved in predetermined but adjustable timed relationship to the other set of blades, in order to time the duration or speed of the exposure. One set of blades (which may also be called a series or system of blades) is used to open the light passage or exposure aperture at the beginning of an exposure, and the other set or series or system of blades is used to close the light passage or exposure aperture at the conclusion of the exposure. The second set or system of blades, used for terminating the exposure, is already open before the exposure begins, and the first set or system of blades, used to start the exposure, remains open after the exposure is terminated by closing the second set of blades.

Each blade system comprises any desired number of shutter blades, conveniently five blades, although a greater or smaller number may be used if desired. For simplicity and clarity of illustration, only one shutter blade of each set or system is illustrated in the drawings, but those skilled in the art will readily understand that the other blades are arranged at intervals around the exposure aperture so that they overlap with each other when they are in closed position.

In the drawings, one blade of the first or opening system of blades is illustrated at 12o, and one blade of the second or closing system of blades is illustrated at 12s. Each blade may be conventional in shape and material, and all ten blades (assuming that there are five blades in each set) are identical with each other, so that they are interchangeable with each other during manufacture and assembly.

The two blade systems are installed in two separate blade chambers, one of which lies axially behind the other. For example, the stationary parts of the shutter housing may include a transverse plate 14, and another transverse plate 16 behind it, the space between these two plates being subdivided by a stationary partition plate 18. The first set or opening set of blades 12o are in the forward compartment between the plate 24 and the partition plate 18, while the second set or closing set of shutter blades 12s are in the rear compartment between the partition plate 18 and the plate 16.

There are fixed bearing pins 20 equal in number to the number of blades in each set. These pins 20 pass through the plates 14, 16, 18, and through slots 12oo and 12ss, respectively, in the blades 12o and 12s, respectively. Thus each bearing pin 20 passes through the slots in one blade of the opening set or system and one blade of the closing set or system.

The construction also includes two separate blade rings or driving rings, shown respectively at 22o and 22s. The former rotates in a groove concentric with the optical axis, formed in the front face of the plate 14, and the latter rotates in a similar groove formed on the rear face of the plate 16. Each blade ring carries pivot pins on which the blades of its respective set or system of blades are pivoted, the pivot pins passing, of course, through suitable circumferentially extending slots in the respective plates 14 and 16.

The pivot pins or driving pins of the blade ring 22o are shown at 24o, and if there are five shutter blades in each set or system, there will be five of these pins 24o, each serving as a pivot for one of the blades, engaging in the driving hole of that particular blade. The similar driving pins or pivot pins of the second blade ring 22s are shown at 24s, and extend into the driving holes of their respective blades 12s. In the manner well understood by those skilled in this art, the rotation of either one of the blade rings in one direction will cause all of the blades of its set or system to swing across the exposure aperture in slightly overlapping relation to each other, to close the shutter against passage of slight, while rotation of the blade ring in the opposite direction will cause the blades to swing outwardly into the annular housing surrounding the exposure aperture, to open the exposure aperture and permit passage of light through it, so far as this particular set or system of blades is concerned. In the particular construction here illustrated, movement of either blade ring is a counterclockwise direction when viewed from the front of the shutter will serve to open the blades controlled by that particular blade ring, while movement of the blade ring in a clockwise direction will close the blades.

Each blade ring carries an impelling pin or driving pin 24oo and 24ss, respectively, for engagement with a main driving member or master member to drive the blade ring to open or close the blades, as the case may be. There are two main driving members or master members, one for each blade ring and set of blades. The first master member, for the first or opening set of blades, is indicated at 26o, pivotally mounted on a fixed pin 28o. This master member is powered by a spring 30o. It has a slot 26oo for engaging the drive pin 24oo on the blade ring 22o.

The second master member is shown at 26s. It is pivotally mounted on a fixed bearing pin or spindle 28s which is spaced, in a direction circumferentially of the shutter, from the bearing pin 28o. The second master member is powered by a driving spring 30s which, like the spring 30o, has one end anchored in fixed position and the other end is appropriately coupled to its respective master member.

The master member 26s has a driving slot 26ss for engaging the drive pin 24ss of the second blade ring 22s. Since the main flange portion of the master member 26s (containing the slot 26ss) is located behind its associated blades 12s and behind the plate 16, this main portion of the second master member is rigidly connected with an auxiliary portion 32 arranged in front of the plate 14 and engaged by the driving spring 30s. The auxiliary disk-like portion 32 has a nose 32n which cooperates with a disk-like change lever 33 pivotally mounted on a stationary pivot 33a and urged in a clockwise direction by the spring 33c.

Both of these master members or operating members 26o and 26s can be held in tensioned or latched position by releasable latches which are operatively connected to each other through adjustable gearing so as to vary the timed relation of release of one latch to the release of the other latch, thereby varying the shutter speed or time of exposure. The gearing is preferably in the form of differential gearing.

The first master member or driving member 26o turns in a counterclockwise direction while being tensioned or cocked, and in a clockwise direction during its effective operating or running-down moton. It is latched in its tensioned position by a latching pawl 36 engaging an abutment shoulder on the master member. The second master member 26s turns in the opposite direction, that is, clockwise when being cocked or tensioned, and counterclockwise when running down, and is latched in its tensioned position by a latching pawl 34 engaging an abutment shoulder on the disk 32 which, as above mentioned, is rigidly connected to the master member 26s and forms, in effect, a part of the master member.

The pawl 34 is rotatably mounted on a pin 38 fixed in the plate 14, and is rigidly connected to a pinion 34z. This pawl and pinion constitute the last or final members of the gear train. The other pawl 36, which constitutes the first member of the gear train, is mounted for rotation on a stationary bearing sleeve 40 which is secured to the plate 14, and is rigidly connected to a toothed wheel or pinion 36z. Also, the pawl 36 has a radially extending arm or nose 36n which lies in the path of travel of a releasing pin which releases the pawl as further described below.

A second pinion 42z is rotatably mounted on the bearing sleeve 40 for rotation independently of the pawl 36 and pinion 36z. It is of different pitch diameter from the pinion 36z. A double pinion 44, rotatable on a pin 46p, has two separate toothed portions of different pitch diameters, one toothed portion 44z meshing with the pinion 36z while the other toothed portion 44zz meshes with the pinion 42z. The pinion 42z meshes not only with the teeth 44zz but also with the teeth of the pinion 34z. The pin 46p on which the double pinion 44 rotates is carried by the free end of an arm 46, the other end of which has a pin 46pp which enters a central bore in the bearing sleeve 40, so that the arm 46 can swing about the bearing sleeve 40 as a center.

It will be seen that the gearing just described constitutes a kind of differential gearing, forming an operative gear train between the releasable latch 36 of the first master member and the releasable latch 34 of the second master member. In this gear train, the pinions 36z and 42z may be regarded as planet gears or wheels, while the double pinion 44 may be regarded as the sun gear or sun wheel of this planetary system. A light spring 34f constantly tends to swing the latching pawl 34 in a clockwise direction toward its latching position, and another light spring 36f constantly tends to swing the other latching pawl 36 in a counterclockwise direction towards its latching position.

Figures 1, 3, 6:
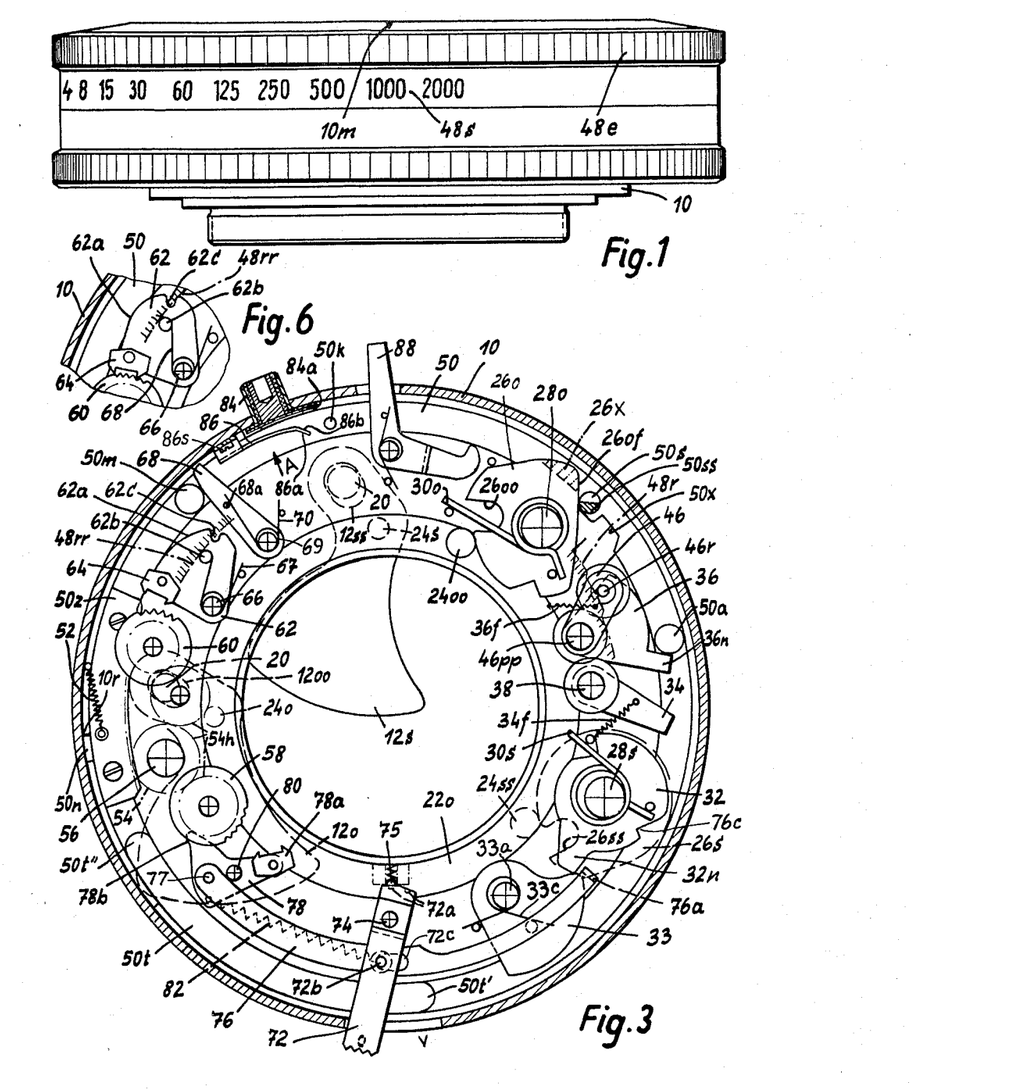
FIG. 1 is a side view of the shutter in accordance with a preferred embodiment of the invention.
FIG. 3 is a fragmentary plan of the shutter, on an enlarged scale, with the cover plate and certain overlying parts removed to show the parts beneath, and with various other parts omitted for the sake of clarity and some parts shown schematically, the shutter being illustrated with the parts in the rest or run-down position at the conclusion of an exposure and with the pre-timer or delayed action mechanism set to an inoperative position.
FIG. 6 is a view similar to a fragment of FIG. 3, but with the retarding mechanism operative so as to produce a slower speed exposure of longer duration, rather than inoperative as it is in FIG. 3.
Figure 2:
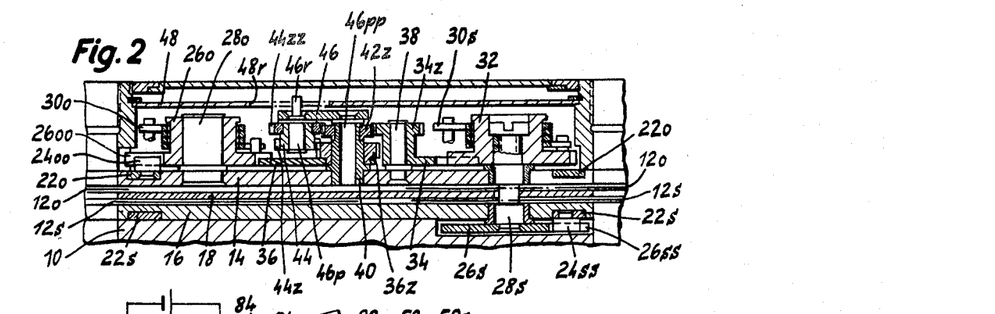
FIG. 2 is a somewhat schematic section through the shutter, approximately on the line II—II of FIG. 4.

It will be seen from FIG. 2 that the above mentioned pin 46p on which the double pinion 44 rotates, depends downwardly from the swinging arm 46, the pinion 44 being located beneath this arm. The same pin preferably has an upwardly extending portion 46r extending above the arm 46 and into the plane of the shutter speed control cam member 48 which, as usual in objective shutters, is rotatably mounted near the front of the shutter housing, about the front lens tube or other suitable part of the structure. This speed control cam member 48 has a cam edge schematically shown at 48r in FIGS. 3 and 4, which forms a stop to engage the pin 46r and thereby to limit the travel of the pin inwardly in a direction toward the optical axis of the shutter, thus limiting the counterclockwise swinging of the arm 46 which carries the pin 46r and which also carries the pinion 44. This shutter speed control cam member 48 is, as usual, an internal member within the camera shutter housing or casing, and is coupled in the usual conventional manner with an externally accessible rotary setting ring 48e (FIG. 1) which can be manually turned so as to bring any desired shutter speed graduation of the scale 48s opposite the fixed index mark or reference point 10m marked on a suitable stationary part of the housing.

A ring 50 is mounted for rotation in the shutter casing, concentrically with the optical axis. This serves as a tensioning or cocking ring, to bring various parts of the shutter mechanism into tensioned position ready for the next exposure, and also as a control ring for controlling certain operations of the shutter during the running down cycle, including the release of the latches of the master members. A return spring 52 tends to turn the ring 50 in a clockwise direction from its own tensioned or cocked position to its run-down position, in which run-down position a projection 50n on the ring 50 engages a stationary stop 10r in the shutter housing. The ring 50 carries a cocking or tensioning pin 50s, a trip pin 50a, a driving pin 50m, a contact making pin 50k, a toothed gear segment 50z, and another segment 50t, the opposite ends of which are respectively designated as 50t' and 50t''. All of these parts will be further mentioned below and their respective functions will be described.

The toothed segment 50z is in meshing engagement with a pinion 54 rigidly connected to the tensioning or cocking shaft 56 which projects outwardly through the rear wall of the shutter housing, parallel to the optical axis, and is adapted to be coupled in the conventional manner to the operating mechanism within the body of the camera on which the shutter is used. Preferably it is connected, as customary, with the film winding or transport mechanism in the camera, so that when the film is wound to bring the next exposure area or frame into exposure position, the shaft 56 is turned counterclockwise, thereby also turning the ring 50 counterclockwise from its run-down or rest position shown in FIG. 3 to its tensioned or cocked position shown in FIG. 4, the ring being held in this tensioned position by a release member or shutter trip 88 having a hook end engaging a notch 50x in the ring 50, and another end projecting out of the shutter casing to an accessible position.

Adjoining the above mentioned pinion 54 and meshing therewith is a gear train system indicated in general at 54h, this gear train system terminating at opposite ends in two star wheels or escapement wheels 58 and 60, respectively. The wheel 60 cooperates with a vibrating anchor or pallet 64 pivotally mounted on the plate 62 which is mounted for rotation on the pin 66 and which has a cam edge 62a as well as an operating pin 62b and a notch or recess 62c. A spring 67 biases the plate 62 to swing in a counterclockwise direction on its pivot 66, but the extent to which it can swing in this direction is limited by engagement of the pin 62b with the cam edge 48rr on the speed control cam member 48, spaced thereon at some distance circumferentially from the previously mentioned control cam edge 48r. A lever 68, pivoted on a pin 69 and urged in a counterclockwise direction by a spring 70, carries a pin 68a which can enter the notch 62c in the plate 62 when this plate is in the proper position to receive such pin, thereby holding the plate 62 in a fixed position (with the vibrating anchor 64 out of contact with the escapement wheel 60) until the pin 68a is released from the notch 62c.

A pre-timer or delayed action control lever 72 is rotatably mounted on the pivot pin 74, and has one end projecting outwardly through a slot in the shutter casing to an external accessible position. The inner end of the lever has two detent notches 72a. By swinging the lever, either one of these notches may be brought opposite the spring detent 75, formed for example as a spring pressed ball, mounted on the outer wall of the lens tube or other suitable fixed part of the shutter. The engagement of the spring detent 75 in one of the notches 72a serves to hold the lever 72 in whichever position it has been set, until it is forcibly moved therefrom by external manual pressure.

A pin 72b carried by the lever 72 engages in a circumferentially extending slot 72c in the circumferentially elongated latching bar or member 76. The left end of this member 76 is pivoted at 77 to one arm of a three arm lever 78 which is pivotally mounted on a fixed pivot 80. A vibrating anchor or pallet 78a is pivotally mounted on the second arm of the three arm lever 78, this vibrating anchor being adapted to cooperate with the escapement wheel 58 so as to constitute a pre-timer delay mechanism, when the three arm lever 78 is swung sufficiently far in a counterclockwise direction on its pivot 80, from the position shown in FIGS. 3 and 4 to the position shown in FIG. 7. The third arm 78b of the lever 78 constitutes an operating nose which, under certain conditions, is engaged and moved by the segment 50t on the control ring 50, as further described below.

The first arm of the lever 78, that is, the arm to which the member 76 is pivoted, is attached to one end of the spring 82, the other end of which is attached to the pin 72b on the arm 72. Thus the spring 82 tends to turn the lever 78 in a counterclockwise direction on its pivot 80, and at the same time tends to keep the pin 72b engaged with the left end of the slot 72c. However, this spring 82 is weaker than the force developed by the detent 75 engaging the notches 72a, so that the spring 82 can never act to displace the lever 72 from the position in which it has been manually set. The right hand end of the elongated member 76 has a downturned ear or lug 76a which, under certain conditions, engages the portion 32 of the second master member or driving member.

Figure 4:
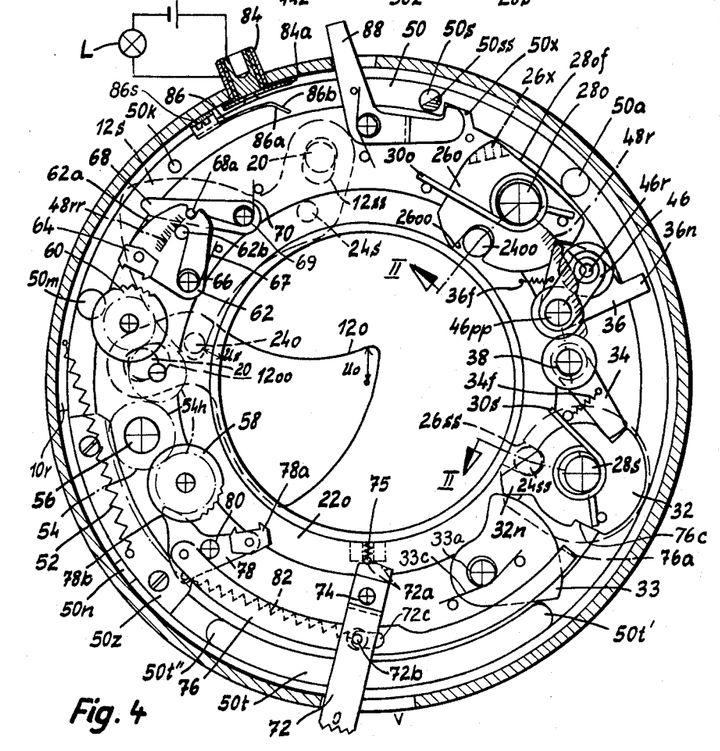
FIG. 4 is a view similar to FIG. 3, showing the parts in tensioned or cocked position.
Figure 5:
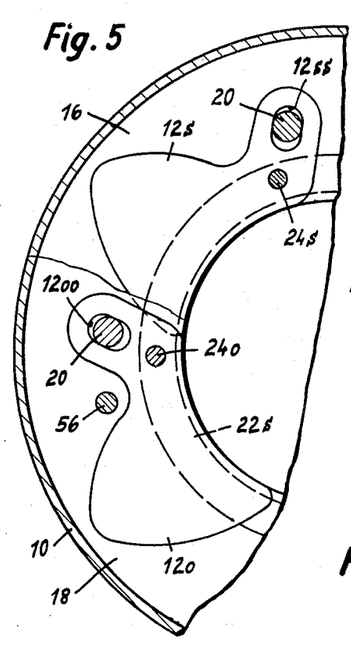
FIG. 5 is a fragmentary plan illustrating particularly the two separate sets of shutter blades (only one blade of each set being shown) with most of the other parts omitted.

At a suitable point on the periphery of the shutter casing there is a flash circuit connection nipple 84 of conventional kind, into which a plug of an electric cord going to the flash apparatus may be inserted in the usual way. The electric cord and the flash lamp L and the source of current such as a battery, are schematically indicated in FIG. 4.

As customary, the connection nipple 84 has two poles electrically insulated from each other, one pole being electrically connected to the metallic casing or housing of the shutter. The other pole, insulated from the first pole as above stated, is conductively connected to a small contact plate 84a mounted on and insulated from the inner face of the side wall of the shutter casing.

Figure 8:
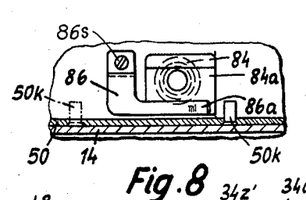
FIG. 8 is a view illustrating the flash synchronizer contact mechanism, seen from the center of the shutter looking radially outwardly in the direction of the arrow A in FIG. 3.

A wiper blade contact spring 86, of L-shaped construction as seen in FIG. 8, is mounted at 86s on the inner face of the side wall of the housing, in electrical contact therewith. The main portion of the contact spring extends in a circumferential direction relative to the shutter casing, spaced slightly inwardly from and out of contact with the contact plate 84a. The free end of the spring 86 is angularly bent outwardly as best seen in FIGS. 3 and 4, so as to have an inner face (facing inwardly toward the center of the shutter) 86a and an outer face 86b, the angularity of the bent end of the contact spring 86 being such that the outer face 86b will be engaged by the contact pin 50k on the ring 50 when the ring is moved from rest position to tensioned position, and the inner face 86a will be engaged by the same pin 50k when the ring 50 runs down from its tensioned position to its rest position.

With a shutter constructed as above described, there are four general setting conditions, as follows:

(A) Normal shutter operation with shutter speed or exposure duration from $\frac{1}{2000}$ of a second to $\frac{1}{500}$ of a second, which may be referred to as short period or high speed normal operation.

(B) Normal operation with shutter speed or exposure duration from $\frac{1}{250}$ of a second to 1 second, which may be referred to as long period or slow speed normal operation.

(C) Shutter operation using pre-timer or delayed action mechanism to delay the beginning of the exposure so that the operator may get in the picture.

(D) Shutter operation using flash illumination.

*Operation in Case A*

During normal shutter operation at high shutter speeds, without use of pre-timer operation or flash illumination, the shutter operates in the manner which will now be described. The rest or untensioned position of the parts is shown in FIG. 3. The pre-timer control lever 72 has been swung leftwardly to its "O" position rather than its "V" position, thereby swinging the lever 78 to a position where the vibrating anchor or pallet 78a is completely away from the star wheel or escapement wheel 58, so that the delayed action mechanism is inoperative. The second vibrating anchor 64 is also out of contact with its escapement wheel or star wheel 60, this being due to the fact that the shutter speed setting ring 48e has been turned to a position for a shutter speed of $\frac{1}{500}$ of a second or faster, and in all of such positions the cam 48rr on the speed control disk 48 acts on the pin 62b to hold the plate 62 in a position where the anchor 64 is out of engagement with the wheel 60.

The two blade systems or series are shown with the two drive members or master members in the run-down or rest position, the blades 12o of the opening system being in their fully open position and the blades 12s of the closing system being fully closed. If the shutter is now cocked, by turning the shaft 56 in a counterclockwise direction (e.g., by operating the film winding mechanism in the camera body, as above mentioned) the meshing engagement of the pinion 54 with the gear segment 50z will cause the control ring 50 to turn in a counterclockwise direction from the position shown in FIG. 3 to the tensioned or cocked position shown in FIG. 4. During this movement of the ring 50, the tensioning pin 50s first makes engagement with the inclined peripheral cam surface 26of on the first master member or driving member 26o, and turns this master member in a counterclockwise direction, thereby tensioning its spring 30o. During this tensioning movement of the first master member, the pin 24oo on the first blade ring 22o engages in the slot 26oo of the master member 26o, so that the blade ring 22o is turned in a clockwise direction, closing all of the shutter blades 12o of the first system. While the pin 50s is turning the master member 26o, the pin 50a is simultaneously receding from the tail 36n on the pawl 36, so that by the time the master member 26o reaches its tensioned position, the spring 36f can swing the latching pawl 36 into the abutment notch on the master member 26o, thereby retaining the master member in tensioned position even though the pin 50s passes on beyond the master member and releases its action on the master member.

During the counterclockwise movement of the latching pawl 36 into latching engagement with the master member 26o, the second latching pawl 34 moves in a clockwise direction under the influence of its spring 34f, until the end of the pawl comes into engagement with the periphery of the disk 32. At this time it can move no further (until the disk 32 is rotated to the point where the abutment notch comes opposite the pawl 34) and the further turning movement of the pawl 36, to become fully engaged in the abutment notch of the member 26o, therefore causes the pinion 44 to turn clockwise on its pivot 46p, so that the teeth 44zz thereof walk around the teeth of the pinion 42z which is stationary at this time. This swings the arm 46 in a clockwise direction on its pivot 46pp, so that the pin 46r thereon is moved outwardly away from the center of the shutter and away from the speed control cam 48r. Later, as further described below, the arm 46 will swing counterclockwise and the pin 46r will be brought again into contact with the cam edge 48r.

After the first set of blades 12o become fully closed, the continuing counterclockwise movement of the ring 50 brings the advancing end 50t' of the segment 50t into contact with the lever 33, swinging this lever counterclockwise on its pivot 33a. The lever engages the nose 32n of the disk 32 of the second master member, and swings this disk in a clockwise direction on its pivot, thereby tensioning the driving spring 30s of this second master member. The clockwise turning of this second master member assembly causes the notch 26ss thereof to engage the pin 24ss on the second blade ring 22s, so as to swing the second blade ring in a counterclockwise direction around the optical axis, thereby opening all of the blades 12s of the second set of blades. From what has been said above, it will be clear that during the tensioning or cocking operation, the blades 12s of the second set do not begin to open until the blades 12o of the first set have become fully closed. At the end of the clockwise tensioning movement of the second master member assembly 26s, 32, the abutment notch in the disk 32 comes opposite the end of the latching pawl 34 and the latching pawl then drops into the abutment notch, under the influence of its spring 34f.

In the meantime, the driving pin 50m on the ring 50 has moved counterclockwise from the rest position shown in FIG. 3, thereby releasing the pressure on the lever 68 so that the spring 70 thereof can turn this lever 68 in a counterclockwise direction to seat the pin 68a in the notch 62c of the plate 62. Likewise the synchronizer contact pin 50k has moved clockwise from the rest position shown in FIG. 3 to the cocked position shown in FIG. 4, and in so doing it has engaged the outer cam face 86b of the switch contact spring 86 and has displaced the switch contact spring inwardly toward the center of the shutter and away from the contact plate 84a, so that no electric contact is made during the cocking or tensioning operation of the shutter. When the ring 50 reaches its fully tensioned position, it is latched in this position by the trip or release latch 88 so that it remains in this tensioned position notwithstanding the fact that the rotative force on the shaft 56 is released in the conventional way at the conclusion of the film winding operation.

Let it be assumed that an exposure speed of $\frac{1}{1000}$ of a second is desired. The speed setting ring 48e, if not already set prior to the tensioning operation, is now set for the desired shutter speed, by bringing the graduation 1,000 on the scale 48s opposite the index mark 10m, as shown in FIG. 1. This turns the speed control cam 48 to bring the desired part of the cam edge 48r opposite the pin 46r on the arm 46, and also the desired part of the cam edge 48rr opposite the pin 62b. As already mentioned, for all speeds faster than $\frac{1}{500}$ of a second, the cam edge 48rr is so formed that the plate 62 stays in the position shown in FIG. 4 and cannot swing counterclockwise from such position. This keeps the vibrating anchor 64 out of engagement with the star wheel 60.

When the trip or release 88 is operated, the control ring 50 is liberated so that it starts to run down in a clockwise direction, under the influence of the spring 52. With the shutter set for the particular condition above mentioned, the running-down movement of the ring 50 occurs rather rapidly, since it is not delayed or impeded at this time by any special delaying or retarding mechanism. During the running-down movement, the trip pin 50a engages the arm 36n on the first latching pawl 36, to release the first master member to initiate the opening movement of the shutter blades. But before this occurs, the end 50t' of the segment 50t has withdrawn from the lever 33 so that the spring 33c can swing this lever in a clockwise direction, back to its rest position, where it no longer engages the nose 32n of the disk 32 and no longer impedes the operation of the second master member. The spring 33c is strong enough to overcome the frictional resistance to turning the member 33. The second master member assembly remains latched by the latch 34, notwithstanding the return movement of the lever 33 to its rest position.

As the pin 50a moves the arm 36n of the pawl 36, to release the pawl from the first master member 26o, the corresponding rotary movement of the pinion 36z will, through the action of the differential gearing, cause the double pinion 44 to walk around the pinion 42z since the latter is now stationary on account of the latch 34 being frictionally held (assisted by the spring 34f) in the latching notch of the member 32. Therefore, the arm 46 which carries the double pinion 44 will tend to swing in a counterclockwise direction on the pivot 46pp until the pin 46r comes into contact with the cam edge 48r. When the pin 46r engages the cam edge 48r and can move no further, the continued motion of the pawl 36 (under the influence of the pin 50a) causes the differential gear train to start to turn the latching pawl 34 in a counterclockwise or releasing direction, overcoming the spring 34f and the frictional resistance of the end of the pawl against the member 32, so that the pawl is finally completely withdrawn from the latching abutment or notch of the member 32 and releases this member, thereby permitting the power spring 30s to start to turn this member in a counterclockwise direction.

It will be realized from what has been said that the latch 36 of the first master member 26o is released first, and the latch 34 of the second master member assembly 26s, 32 is released later, at a variable or adjustable time after the release of the first latch, the time interval depending upon the initial distance of the pin 46r from the cam edge 48r, or in other words depending upon the extent to which the arm 46 carrying the sun gear 44 is permitted to swing freely before its further movement is stopped by engagement with the cam edge 48r. When the first master member 26o is released, it will turn in a clockwise direction under the influence of its driving spring 30o, and the action of the notch 26oo on the pin 24oo will move the first blade ring 22o in a counterclockwise direction to open the blades 12o of the first or opening set. The unlatching of the second master member assembly 26s, 32, occurring at a brief time interval after the unlatching of the first master member, will allow this second master member assembly to turn in a counterclockwise direction under the power of its spring 30s, so that the action of the notch 26ss on the pin 24ss will turn the second blade ring 22s in a clockwise direction, closing the blades 12s of the second blade system or set. This terminates the exposure.

Meanwhile, during the latter part of the running-down movement of the ring 50, the pin 50m thereon has engaged the lever 68 and has carried this lever in a clockwise direction, withdrawing the pin 68a from the notch 62c of the plate 62. Under certain types of exposure conditions, this would permit the spring 67 to swing the plate 62 in a counterclockwise direction so as to engage the vibrating anchor 64 with the star wheel 60, to make the retarding mechanism operative. However, under the particular exposure conditions now being discussed, this counterclockwise movement of the plate 62 does not occur, because of the engagement of the pin 62b with the cam edge 48rr of the speed setting cam.

Before the tensioning pin 50s on the ring 50 reaches the position of the first master member 26o during the running-down movement, the master member has already turned to the point where it lies in the path of travel of the pin 50s. However, this does not constitute an impediment to the continued running-down movement of the ring 50, for the reason that the pin 50s is not a stationary pin on the ring 50, but is an axially displaceable pin which is spring pressed in known manner to project it the necessary distance from the top face of the ring 50, but which can be depressed against the action of the spring, in a direction parallel to the optical axis. One side of the pin 50s is beveled as indicated schematically at 50ss, and the underface of the first master member 26o is beveled as indicated schematically at 26x. During the tensioning movement, an unbeveled part of the pin 50s engages an unbeveled part of the master member 26o, to swing the master member to its tensioned or cocked position. But during the running down movement of the ring 50, the beveled part 50ss of the pin engages the beveled part 26x of the master member, displacing the pin in an axial direction so that it passes beneath the master member. Thus the control ring 50 is able to reach its rest or run-down position at the end of the exposure, and of course all of the other parts likewise assume their rest positions.

It is significant that in the case of short period exposures, say from 1/500 of a second to the highest shutter speed, the lapse of time between the moment that the opening blade system is released and the time at which the closing blade system is released, is dependent solely on the distance of the control pin 46r from the control cam edge 48r of the time setting ring 48e, because the frictional resistance applied to the running down of the shutter parts (inclusive of the frictional resistance of the gear train 54h, 58 and 60, which is always the same) can be regarded as a constant. By virtue of the differential gear train which is incorporated in an operative position between the two latching pawls 34 and 36, according to the present invention, this lapse of time between the release of the opening system and the release of the closing system can be continuously regulated as required, to any desired value within the upper and lower limits.

One of the reasons why the shutter of the present invention is able to make exposures of such high speed, up to 1/2000 of a second at full aperture, and up to a speed of even 1/3000 of a second at partial aperture, is that, in addition to having two separate sets of shutter blades, one for opening the exposure aperture and one for closing it, these blades are so arranged that they can start their respective motions and get up speed, before they reach positions which actually affect the exposure. Thus for example, in the case of the opening blades 12o, these blades in their closed positions do not just barely meet sufficiently to exclude light, as is the case with conventional objective shutters, but they overlap each other to a considerable extent so that there is what might be called a "lost motion" or preliminary motion before the beginning of the exposure, giving the blades an opportunity to speed up their motion from their previous stationary condition to a fast moving condition, before the exposure actually begins. This is schematically indicated in FIG. 4 by the line Uo, extending from the optical axis to the tip of the blade 12o. During the opening movement, the tip of the blade must move to this distance Uo before the exposure begins, and thus the blade is already moving quite rapidly at the instant that the exposure actually begins. Likewise the blades 12s of the second or closing set of blades, are positioned not just at the edge of the exposure aperture, but actually at some distance outside the edge of the exposure aperture, the tips of the blades being outside the exposure aperture by a distance indicated by the line $Us$. Thus the closing blades, when they start their closing movements, make this preliminary motion or lost motion through the distance $Us$ before they begin to cover the exposure aperture, thereby speeding up from their previous stationary condition to a fast moving condition, before they actually affect the exposure.

The action of the shutter in making the short period exposures now under discussion, as well as other types of exposures, is illustrated graphically in the shutter diagrams constituting FIGS. 11–14. These diagrams are of the familiar kind well understood in the photographic shutter art. In all of them, the horizontal dimension or abscissa represents time, while the vertical dimension or ordinate represents the diameter of the opening. The first oblique line, at the left, represents the motion of the opening set of blades with respect to time, and the oblique line to the right represents the motion of the closing set of blades, with respect to time. The horizontal dot dash line $t_e$ represents the effective time of the exposure.

Figure 11:
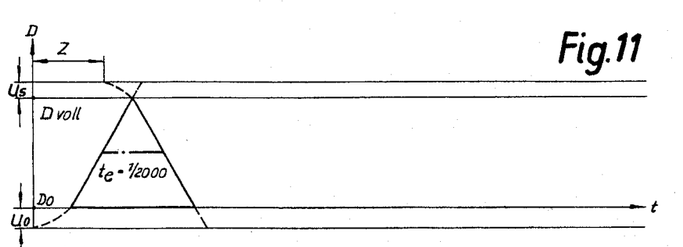
FIGS. 11–14 are operating diagrams illustrating the shutter operation under various different conditions.
Figure 12:
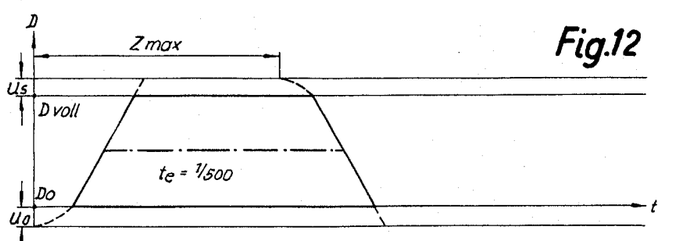

In FIGS. 11 and 12, which represent exposures of different speeds within the "short period" conditions of Case A, it is seen that as the blades of the opening set start to move from their initial tensioned and overlapped position, they speed up in the manner illustrated by the curved dotted portion of the opening line, at the lower left corner of each diagram. They move through the initial distance $Uo$ without affecting the exposure. Upon reaching the horizontal line $Do$, which is the point at which the initial overlap is eliminated, the exposure begins, and the exposure aperture becomes progressively greater until the blades reach the point of maximum or full aperture represented by the horizontal line $Dvoll$.

The other or closing set of blades perform motions represented on the diagram by the second oblique line. Coming downwardly from the top, the first dotted curved part of the line represents the initial motion of speed-up through the distance $Us$, before the closing motion begins to affect the size of the exposure aperture. Then as represented by the straight oblique portion of the line, the closing blades decrease the size of the exposure aperture until it is completely closed when the oblique line reaches the horizontal line $Do$.

It is seen that the effective duration of the exposure is determined by the time interval Z between the moment that the opening blade system is released and the moment that the closing blade system is released. As above explained, this depends, in the present construction, on the spacing between the pin 46r and the cam edge 48r; that is, on the extent to which the arm 46 is allowed to swing before the swinging motion is stopped so that the differential gearing picks up the second release pawl 34 and releases the closing blades. The present shutter is so designed that when the time interval Z is as indicated in FIG. 11, so that the closing blades begin to close the aperture just at the instant that the opening blades have reached full aperture, the resulting equivalent exposure will be 1/2000 of a second. When the shutter is set with maximum distance between the pin 46r and the cam edge 48r, to allow maximum swinging of the arm 46, the time interval delay resulting from the differential gear train is the time interval represented by $Z_{max}$ in FIG. 12, and this results in an equivalent exposure time of 1/500 of a second. For slower shutter speeds (longer duration of exposure) other delaying means must be used to supplement the delay caused by the differential gear train between the latching pawls 34 and 36.

*Setting Case B*

If it is desired to take a picture with a longer exposure time (for example, from an exposure time of 1/250 of a second to the longest internally timed exposure of one second) the shutter speed setting ring 48e is turned to bring the desired speed graduation of the scale 48s to a position opposite the index mark 10m. This brings a different part of the cam edges 48rr opposite the pin 62b, enabling the plates 62 to swing counterclockwise (unless otherwise restrained by the pin 68a) to a position where the vibrating anchor or pallet 64 is engaged with the star wheel or escapement wheel 60, as shown in FIG. 6.

The cocking or tensioning of the shutter proceeds exactly the same as described under Case A, except that during the counterclockwise tensioning movement of the ring 50, the pin 50m thereon engages the cam edge 62a on the plate 62 and swings this plate clockwise on its pivot 66, against the force of the spring 67, until the pin 68a on the lever 68 (which has meanwhile been released by the pin 50m) can engage in the notch 62c to retain the plate 62 in this clockwise displaced position, with the anchor 64 out of contact with the escapement wheel 60.

When the shutter is tripped or released by operation of the member 88, the control ring 50 starts to move in a clockwise direction just as it did in Case A. During the running down movement, the pin 50m engages the lever 68 and moves this lever to withdraw the pin 68a from the notch 62c of the plate 62, thereby enabling the spring 67 to turn the plate 62 in a counterclockwise direction (which is now permitted by the shape of the cam 48rr) to bring the vibrating anchor or pallet 64 into operative engagement with the star wheel or escapement wheel 60, thereby causing the gear train 56, 54h, 60 to interpose substantial resistance to the running down motion of the ring 50, to slow down the motion of this ring under the influence of its spring 52.

Figure 13:
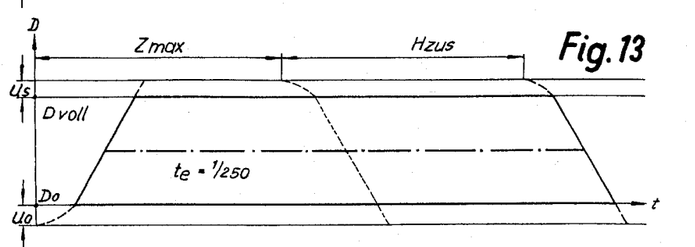

Hence in this Case B, the constant delay caused by the retarding gear train 56, 54h, 60 and represented by the line $Hzus$ in FIG. 13, is added to the variable delay time resulting from the differential gear train which connects the two release pawls to each other, thereby resulting in the desired exposure of slower speed or longer duration. Those skilled in the art will readily understand that various constant delay times of longer or shorter duration may be brought selectively into play or added together cumulatively, so as to obtain exposures of any desired duration, by having two or more delaying gear trains in the shutter casing, selectively or cumulatively rendered effective by proper shaping of the control cam surface like the cam edge 48rr.

*Setting Case C*

The present shutter provides what is sometimes called pre-timing or delayed action mechanism, to delay the beginning of the exposure for an interval of, for example, ten or fifteen seconds after the shutter trip or release is actuated, to enable the operator to have time to place himself in front of the camera so as to be included in the picture. This delayed action mechanism is rendered effective by turning the lever 72 from the "O" position shown in FIGS. 3 and 4 to the "V" position shown in FIG. 7. This brings the other notch of the two notches 72a into engagement with the detent 75, instead of the first notch.

The counterclockwise swinging of the lever 72 moves the pin 72b in a counterclockwise direction circumferentially in the shutter casing, and the spring 82 attempts to make the elongated member 76 follow along in the same counterclockwise direction and to the same extent. This swings the lever 78 in a counterclockwise direction on its pivot 80.

Figure 7:
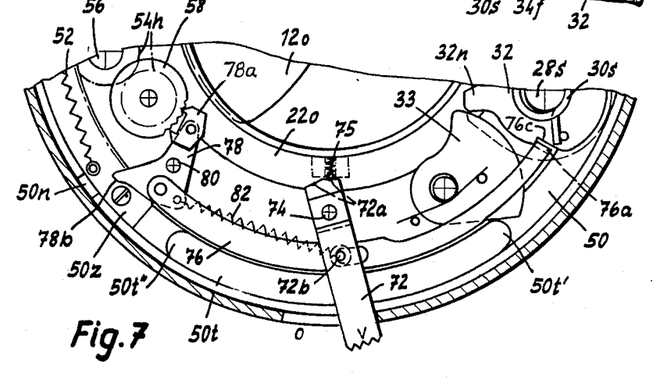
FIG. 7 is a fragmentary view similar to the lower part of FIG. 4, but with the pre-timer or delayed action mechanism set for operation.

If the shutter has already been tensioned or cocked before the lever 72 is moved to the "V" position, the elongated member 76 can move all the way with the lever 72, becaused in the tensioned position there is a notch 76c in the disk 32 of the second master member, opposite the end 76a of the member 76, so that the member 76 can make its full circumferential movement. This swings the lever 78 through its full movement, bringing the vibrating anchor or pallet 78a into operative engagement with the escapement wheel or star wheel 58, as shown in FIG. 7.

However, if the lever 72 is moved from its "O" position to its "V" position while the shutter is in its run-down or rest position rather than in its tensioned position, it is desirable not to make the pre-timer effective until after the shutter has been tensioned, so that the pre-timer mechanism does not introduce extra resistance to the tensioning or cocking operation. That is why the pin 72b of the lever 72 enters a slot 72c in the member 76, rather than being directly pivoted without play. Because of this slot 72c, the lever 72 can always make its full motion to the "V" position when desired, regardless of whether the shutter is in the rest position or in the tensioned position. But if the shutter is in the rest position, the member 76 can move circumferentially only until the end 76a engages a protruding part of the periphery of the disk 32. In other words, the member 76 cannot follow the complete movement of the lever 72 although the spring 82 tries to pull it all the way. When the end 76a engages the projecting portion of the periphery of the disk 32, the lever 78 is not swung quite far enough to engage the anchor 78a with the escapement wheel 58. Thus the resistance of the pre-timer is ineffective, and does not impede the tensioning operation. At this time the pin 72b of the lever 72 is at the right end of the slot 72c rather than the left end, and of course the spring 82 tends to pull the pin back to the left end of the slot, but is unable to overcome the resistance offered by the detent 75.

The tensioning operation then proceeds in the normal manner. When the disk 32 of the second master member assembly reaches its fully tensioned or cocked position, the notch 76c comes opposite the end 76a of the member 76, thus allowing the spring 82 to pull the member 76 slightly further in a circumferential direction, into the notch, thereby giving the lever 78 a slight additional turning movement sufficient to bring the vibrating anchor or pallet 78a into the proper operative engagement with the escapement wheel 58.

In this position, the nose or arm 78b on the lever 78 lies in the path of travel of the segment 50t on the ring 50. If the shutter is now tripped or released to start the exposure cycle, the control ring 50 will start to run down in a clockwise direction under the power of its spring 52. However, the pre-timer gear train 56, 54h, 58 will be fully effective and will greatly slow down the progress of the ring 50, so that a suitable interval (say ten or fifteen seconds) will elapse before the release pin 50a on the ring reaches the arm 36n on the first latching pawl 36. Meanwhile, just before the pin 50a reaches the latching pawl, the end 50t'' of the segment 50t on the ring 50 will reach and engage the nose 78b on the lever 78, and will swing this lever in a clockwise direction on its pivot 80, to carry the vibrating anchor or pallet 64 out of engagement with the escapement wheel 58. During the remainder of the running down movement, the inner edge or surface of the segment 50t will remain in engagement with the nose 78b of the lever 78, and will continue to hold this lever in a position keeping the escapement anchor 64 out of contact with the escapement wheel 58, during the remainder of the running-down cycle. The remainder of the running-down cycle, after the pre-timer mechanism is disengaged by the segment 50t, will be the same as described above under Case A or Case B.

*Setting Case D*

When making a picture by flash light illumination, the electric conductor cord going to the flash apparatus is operatively connected to the nipple 84 as already mentioned previously. As the control ring 50 runs down in a clockwise direction, the flash contact pin 50k engages the inclined or cam-like outer surface 86a of the switch spring 86, and thus flexes the spring radially outwardly away from the center of the shutter, bringing it into contact with the contact plate 84a, thus closing the electric circuit at this point and firing the flash apparatus. As the ring 50 continues its motion, the pin 50k slides off the end of the spring 86 and the resilience of the spring moves it inwardly again, away from the contact plate 84a.

The moment at which the contact is made is determined by the relative positioning of the parts 50k and 86a, and is so arranged that the flash from the flash light L occurs with maximum brilliance or intensity only while the shutter is fully open. If the spring 86 is mounted in stationary position on the shutter casing, the parts are preferably proportioned for what is called "X" synchronization, the closing of the circuit occurring at the instant of full opening of the shutter blades, for use with flash apparatus having no time lag between the instant of closing the electric circuit and the instant of maximum brilliance of illumination. If, however, the spring 86 is mounted in a circumferential slot in the shutter casing, so that it can be moved a slight distance in a circumferential direction and held in desired position by means of a spring detent, this enables the spring 86 to be moved in a counterclockwise direction from its "X" position so that the pin 50k will close the contact a little before the shutter blades reach maximum opening. This will produce what is called "M" synchronization, allowing for the necessary time lag which occurs in certain types of flash apparatus, between the time that the electric circuit is closed and the time that the resulting illumination reaches its maximum brilliance.

It may be mentioned that the flash contact or synchronization feature of the present invention can be used under all conditions, whether the shutter is set for the above described Case A, or Case B, or Case C.

Figure 9:
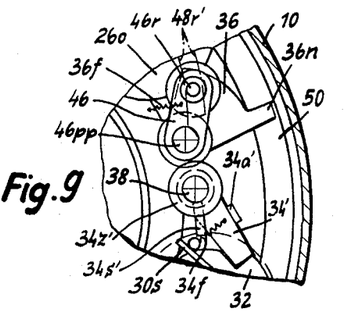
FIG. 9 is a fragmentary view similar to a portion of FIG. 4, illustrating a modified construction of the differential gear train which controls in part the duration or speed of the exposure.
Figure 10:
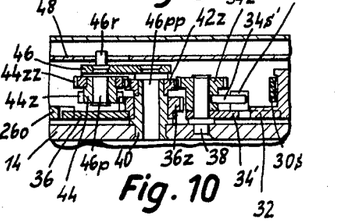
FIG. 10 is an axial section through the modified construction shown in FIG. 9.

Referring now to a modified form or second embodiment of the present invention, this is illustrated in FIGS. 9 and 10, and involves only a modification of the differential gear train mechanism which operatively connects the latching pawl 36 with the latching pawl 34, and a modification of the speed setting cam which controls the setting of this gear train. All others parts of the modified construction are the same as in the first embodiment described above. The parts which are not changed bear the same reference numerals in FIGS. 9 and 10, as in the first embodiment, and need not be further described.

In the first embodiment, the latching pawl 34 for the second master member assembly was integral with or rigidly connected to the pinion 34z. In the second embodiment, however, these two parts are separate and have a lost motion connection with each other. The latching pawl is here shown (FIGS. 9 and 10) at 34', and is rotatable on the pivot 38 independently of the pinion 34z'. The pinion carries a radial projection or radial pin 34s', in position to engage an upstanding ear or lug 34a' on the latching pawl 34'.

In the first embodiment, the cam edge 48r of the speed control cam did not confine the pin 46r, except in one direction. In other words, the pin 46r was free to swing outwardly away from the edge 48r. In the modified construction, however, the speed control cam is formed with a slot 48r' just wide enough to receive the pin 46r, and the ear depending upon the position to which the so that the pin is always confined in the cam slot and cannot swing either inwardly toward the center of the shutter or outwardly away from the center of the shutter, except as such swinging is caused by adjustment of the speed control cam to a new position.

FIG. 9 shows this modified construction in tensioned or cocked position. The latching pawl 36 is fully engaged with the first master member 26o to hold this master member in its tensioned position, and the latching pawl 34' is fully engaged with the disk 32 of the second master member assembly, holding it in its tensioned position. The pin 34s' is spaced angularly at some distance away from the ear 34a', the angular distance between the pin arm 46 has been swung by the action of the cam slot 48r' on the pin 46r.

When the shutter is tripped or released to start the exposure cycle, the control ring 50 will begin to run down in a clockwise direction, just as in the first embodiment, and the trip pin 50a on this ring will engage the arm 36n on the latching pawl 36 and will swing this pawl to release it from the first master member 26o. This will also cause rotation of the differential gearing and will move the pinion 34z′ in a direction to carry its pin 34s′ toward the upstanding ear 34a′ of the second latching pawl 34′. At an adjustably variable time interval, depending upon how far the pin 34s′ was initially separated from the ear 34a′, the pin will make contact with this ear, and the further motion of the pinion 34z′ and pin 34s′ will carry the latching pawl 34′ along with it, releasing this latching pawl so that the second master member assembly can run down and can close the second set or system of shutter blades.

When the differential gear train is modified in this manner, all of the other functions of the shutter remains the same as before, and the shutter can be used in all of the above described settings, Cases A through D, inclusive.

As already mentioned, the shutter of the present construction enables the making of extremely fast exposures, considerably faster than those possible with conventional objective shutters, and enables this to be achieved by relatively simple mechanism which can be easily constructed and serviced, and which is sturdy and reliable in operation, with simple and correct adjustment of the exposure time in a smooth and continuous manner throughout the range, that is, without sudden or abrupt steps in changing from one exposure speed to another. The ability of the shutter to operate at high speeds is due partly to the fact that two separate sets of shutter blades are used so that one set can start its closing motion before the other set completes its opening motion, and partly to the fact that with these two sets of blades, it is not necessary for any blade to reverse its motion during the exposure cycle, and partly to the fact that the blades have an initial or preliminary speed-up motion before they begin to affect the exposure either in an opening direction or a closing direction.

Figure 14:
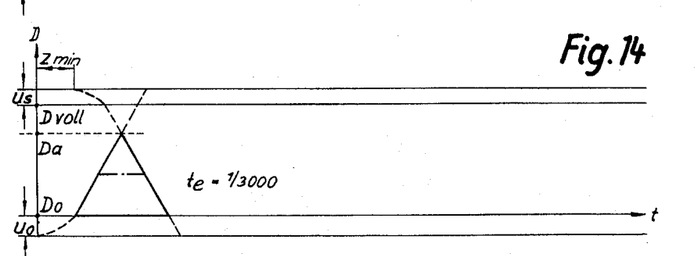

It has already been explained above in connection with the shutter diagram in FIG. 11, that shutter speeds as high as $\frac{1}{2000}$ of a second can be obtained with full aperture. It should now be pointed out that even faster exposure speeds are possible if one does not need to have full aperture. Referring to FIG. 14, for example, this illustrates the operation of the shutter when the differential gear train is adjusted to unlatch the second master member assembly at a minimum time (shown on the diagram as $Z_{min}$) after the unlatching of the first master member. Under these conditions, the second or closing set or system of blades starts to close the exposure aperture before the first or opening set or system of blades reaches full aperture. It is seen from the diagram that the actual maximum aperture during exposure never reaches the full aperture represented by the vertical distance to the line D$voll$, but attains only the restricted or partial aperture indicated by the vertical distance to the dotted line D$a$. The equivalent exposure in this case, $t_e$ is $\frac{1}{3000}$ of a second.

It is seen from the foregoing disclosure that the objects and purposes of the invention are well fulfilled. It is to be understood that the foregoing disclosure is given by way of illustrative example only, rather than by way of limitation, and that without department from the invention, the details may be varied within the scope of the appended claims.

This invention is in the nature of an improvement upon the invention disclosed in the copending patent application of Peter Lermann, Serial No. 321,173, filed Nov. 4, 1963.

What is claimed is:

1. A photographic shutter capable of making an exposure under any one of a plurality of separate operating conditions and comprising means defining an exposure aperture, a first blade system movable from closed position to open position with respect to said aperture to initiate an exposure, a second blade system independently movable from open position to closed position with respect to said aperture to terminate an exposure, means for driving said first blade system toward open position and for driving said second blade system toward closed position, a first latch for holding said first blade system in closed position, a second latch for holding said second blade system in open position, a plurality of devices for affecting the operation of the shutter, and a control member movable through a running down movement from a tensioned position to a rest position, characterized by the fact that said control member has a plurality of control projections (50a, 50k, 50m, 50t″) at fixed distances from one another, one of said projections (50a) being effective during such movement to release said first latch and to release said second latch at an adjustably variable time after the release of said first latch, the others of said projections (50k, 50m, 50t″) engaging and operating said plurality of devices.

2. A photographic shutter as defined in claim 1 further characterized by the fact that said plurality of devices include a flash synchronizer switch (86) operated by one of said projections (50k), a retarding gear pallet carrier (62a) having a locking lever (68) operated by another of said projections (50m), and a pre-timer delay member (78) operated by another of said projections (50t″).

3. A photographic shutter capable of making an exposure under any one of a plurality of separate operating conditions and comprising means defining an exposure aperture, a first blade system movable from closed position to open position with respect to said aperture to initiate an exposure, a second blade system independently movable from open position to closed position with respect to said aperture to terminate an exposure, means for driving said first blade system toward open position and for driving said second blade system toward closed position, a first latch for holding said first blade system in closed position, a second latch for holding said second blade system in open position, an adjustable gear train operatively connected to both of said latches and moved by movement of said first latch to cause movement of said second latch, a control member movable through a running down movement from a tensioned position to a rest position and effective during such movement to move said first latch to a released position and thereby to operate said gear train to release said second latch at an adjustably variable time after the release of said first latch, a retarding gear train separate from said adjustable gear train, and setting means selectively settable to render said retarding gear train effective or ineffective, said retarding gear train when effective serving to retard the running down movement of said control member after the time that it releases said first latch and before it releases said second latch.

4. A construction as defined in claim 3, further including a synchronizer contact switch for closing an electric flash illuminating circuit, and a portion on said control member for closing said switch during said running down movement of said control member and in timed relation to the release of said first latch.

5. A construction as defined in claim 4, wherein said contact switch and said portion on said control member which closes said switch during running down movement of said control member are so formed with respect to each other that said portion does not close said switch during reverse movement of said control member from rest position to tensioned position.

6. A photographic shutter capable of making an exposure under any one of a plurality of separate operating conditions and comprising means defining an exposure aperture, a first blade system movable from closed position to open position with respect to said aperture to initiate an exposure, a second blade system independently movable from open position to closed position with respect to said aperture to terminate an exposure, a first drive member movable from a tensioned position to a rest position and effective during such movement to open said first blade system, a first latch for holding said first drive member in tensioned position, a second drive member movable from a tensioned position to a rest position and effective during such movement to close said second blade system, a second latch for holding said second drive member in tensioned position, an adjustable gear train operatively connected to said second latch, a control member movable through a running down movement from tensioned position to rest position and movable reversely through a tensioning movement from rest position to tensioned position, pre-timer escapement mechanism operatively connected to said control member and including a first vibrating anchor shiftable from an effective delaying position to an ineffective non-delaying position, retarding gear escapement mechanism also operatively connected to said control member and including a second vibrating anchor shiftable from an effective delaying position to an ineffective non-delaying position, a spring tending to move said second anchor toward its effective delaying position, and an anchor latch for holding said second anchor in its ineffective non-delaying position against the force of said spring, said control member having respective portions effective during tensioning movement of the control member to move said first drive member and second drive member from their respective rest positions to their respective tensioned positions and to move both of said vibrating anchors from their respective delaying positions to their respective non-delaying positions, and effective during running down movement of the control member to release said first latch and to operate said adjustable gear train to release said second latch at an adjustably variable interval after the release of said first latch and to release said anchor latch so that said spring may move said second anchor to its effective delaying position prior to the release of said second latch.

7. A construction as defined in claim 1, in which said adjustable gear train is in the form of differential gearing having two planet wheels operatively connected respectively to said first latch and said second latch and a sun wheel meshing with said planet wheels and having an operating pin, and further including a shutter speed setting cam cooperating with said operating pin.

8. A photographic shutter comprising a set of shutter blades, an operating member movable from a tensioned position to a rest position and effective during such movement to shift said blades, a movable control member for causing movement of said operating member in predetermined relation to movement of said control member, pre-timer resistance means for delaying movement of said control member, said resistance means having a part shiftable from an ineffective position to an effective position, a shifter manually shiftable from a first position holding said part in its ineffective position to a second position tending to move said part to its effective position, a portion operatively connected to said part and having a path of travel blocked by said operating member except when said operating member is in its tensioned position, to prevent said part of said resistance means from being moved to its effective position except when said operating member is in its tensioned position, and a spring-biased lost motion connection between said shifter and said portion, so formed that when said shifter is moved to its second position while said operating member is in its rest position, said portion will tend to follow to its effective position but will be prevented from moving fully to its effective position by contact of said part with said operating member, and will later move fully to its effective position when said operating member is moved to its tensioned position.

9. A construction as defined in claim 8, further including cooperating interengaging portions on said control member and said part of said resistance means for shifting said part of said resistance means to an ineffective position at an intermediate stage during a running down movement of said control member.

References Cited by the Examiner
UNITED STATES PATENTS

| | | | |
|---|---|---|---|
| 1,159,169 | 11/1915 | Brown | 95—53.3 |
| 2,354,168 | 7/1944 | Aiken | 95—63 |
| 2,800,844 | 7/1957 | Durst | 95—60 |
| 2,803,181 | 8/1957 | Willcox | 95—60 |
| 3,008,395 | 11/1961 | Leda | 95—53.3 |
| 3,103,862 | 9/1963 | Kiper | 95—53.3 |

JOHN M. HORAN, *Primary Examiner.*